US010077360B2

(12) United States Patent
Kim et al.

(10) Patent No.: US 10,077,360 B2
(45) Date of Patent: Sep. 18, 2018

(54) POLYCARBONATE RESIN COMPOSITION AND METHOD OF PREPARING THE SAME

(71) Applicant: LG CHEM, LTD., Seoul (KR)

(72) Inventors: Min Ji Kim, Daejeon (KR); Su Kyoung Lee, Daejeon (KR); Ryul Lee, Daejeon (KR); Sung Ho Lee, Daejeon (KR); Jong Hyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 98 days.

(21) Appl. No.: 15/035,189

(22) PCT Filed: Dec. 1, 2015

(86) PCT No.: PCT/KR2015/013008
§ 371 (c)(1),
(2) Date: May 6, 2016

(87) PCT Pub. No.: WO2016/089090
PCT Pub. Date: Jun. 9, 2016

(65) Prior Publication Data
US 2016/0340508 A1      Nov. 24, 2016

(30) Foreign Application Priority Data

Dec. 1, 2014    (KR) .................. 10-2014-0169416
Dec. 22, 2014   (KR) .................. 10-2014-0186276
Dec. 1, 2015    (KR) .................. 10-2015-0169672

(51) Int. Cl.
| C08K 3/32 | (2006.01) |
| C08L 69/00 | (2006.01) |
| C08J 5/08 | (2006.01) |
| C08K 7/14 | (2006.01) |
| C08L 51/00 | (2006.01) |

(52) U.S. Cl.
CPC .............. *C08L 69/00* (2013.01); *C08J 5/08* (2013.01); *C08K 3/32* (2013.01); *C08K 7/14* (2013.01); *C08L 51/00* (2013.01); *C08K 2003/321* (2013.01); *C08K 2003/328* (2013.01)

(58) Field of Classification Search
CPC .. C08L 69/00; C08K 3/32; C08K 7/14; C08K 2003/321; C08K 2003/328
See application file for complete search history.

(56) References Cited

U.S. PATENT DOCUMENTS

| 5,122,556 | A  * | 6/1992  | Kambour ................. C07F 9/12 |
| | | | 524/127 |
| 9,394,483 | B2 * | 7/2016  | Wu ......................... C08K 3/22 |
| 9,732,217 | B2 * | 8/2017  | Wan ........................ C08L 69/00 |
| 9,745,465 | B2 * | 8/2017  | Motegi .................... C08K 7/14 |
| 2002/0022686 | A1 * | 2/2002  | Itoh ....................... C08F 279/02 |
| | | | 524/504 |
| 2012/0276390 | A1 | 11/2012 | Ji et al. |
| 2012/0279764 | A1 | 11/2012 | Jiang et al. |
| 2013/0317144 | A1 | 11/2013 | Wu et al. |
| 2014/0162070 | A1 | 6/2014  | Motegi et al. |

FOREIGN PATENT DOCUMENTS

| CN | 102770278 A | 11/2012 |
| CN | 104023990 A | 9/2014 |
| EP | 2335936 A1 | 6/2011 |
| EP | 2910605 A1 | 8/2015 |
| JP | 2012-87234 A | 5/2012 |
| JP | 2013-515118 A | 5/2013 |
| JP | 2014-43549 A | 3/2014 |
| JP | 2014-74162 A | 4/2014 |
| JP | 2014-530263 A | 11/2014 |
| KR | 10-2010-0055474 A | 5/2010 |
| KR | 10-2012-0139680 A | 12/2012 |
| KR | 10-2014-0052833 A | 5/2014 |
| KR | 10-2014-0095110 A | 7/2014 |
| WO | 2014/115475 A1 | 7/2014 |
| WO | 2015053159 A1 | 4/2015 |

* cited by examiner

*Primary Examiner* — Vickey M Nerangis
(74) *Attorney, Agent, or Firm* — Dentons US LLP

(57) ABSTRACT

The present invention relates to a polycarbonate resin composition. According to the present invention, a polycarbonate resin composition, which realizes a high whiteness degree, exhibits less discoloration due to superior heat stability during storage and processing, and has improved fluidity, laser reactivity, and plating adhesion, and a method of preparing the same are provided.

19 Claims, 1 Drawing Sheet

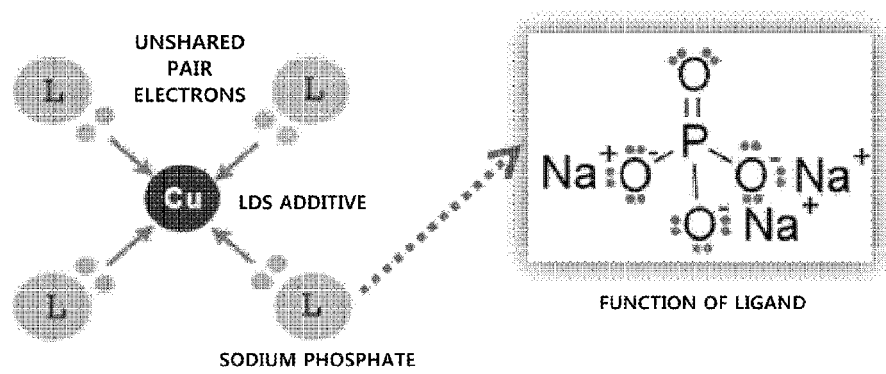

POLYCARBONATE RESIN COMPOSITION AND METHOD OF PREPARING THE SAME

CROSS-REFERENCE TO RELATED APPLICATION(S)

This application is a National Stage Application of International Application No. PCT/KR2015/013008 filed on Dec. 1, 2015, which claims the benefit of Korean Patent Application No. 10-2014-0169416 filed on Dec. 1, 2014, Korean Patent Application No. 10-2014-0186276 filed on Dec. 22, 2014 and Korean Patent Application No. 10-2015-0169672filed on Dec. 1, 2015, all of which are hereby incorporated by reference in their entirety for all purposes as if fully set forth herein.

TECHNICAL FIELD

The present invention relates to a polycarbonate resin composition. More particularly, the present invention relates to a polycarbonate resin composition having superior heat stability and less discoloration and being applicable to a laser direct structuring method and a method of preparing the same.

BACKGROUND ART

Recently, a method of manufacturing electrical components using a laser direct structuring (LDS) method attracts attention.

The LDS method is characterized by adding a conductive material to a nonconductive plastic, reacting the same using laser, and forming a regular pattern thereon, followed by selective plating. By using the LDS method, a metal structure such as an antenna, etc. can be directly formed on a resin substrate surface without use of an adhesive. With regard to this, US Patent Laid-Open Publication Nos. 2012-0276390 and 2012-0279764, etc. disclose methods of adding a predetermined amount of an additive for laser direct structuring so as to improve laser reactivity and plating adhesion of a polycarbonate resin.

However, the conventional technologies have a limitation in increasing a whiteness degree and exhibit discoloration due to low heat stability during storage and processing. In addition, due to low fluidity in the conventional technologies, there are limitations in applying the conventional technologies in accordance with a current market trend wherein enlargement and slimming are kept and white products are preferred. Accordingly, there is a need for a polycarbonate resin composition that can be used in the laser direct structuring method so as to overcome the problems and limitations.

RELATED ART DOCUMENTS

Patent Document (Patent Document 1) US 2012-0276390 A1
(Patent Document 2) US 2012-0279764 A1

DISCLOSURE

Technical Problem

Therefore, the present invention has been made in view of the above problems, and it is one object of the present invention to provide a polycarbonate resin composition that realizes a high whiteness degree, exhibits less discoloration due to superior heat stability during storage and processing, and has improved fluidity, laser reactivity, and plating adhesion.

It is another object of the present invention to provide a method of preparing the polycarbonate resin composition.

The above and other objects can be accomplished by the present invention described below.

Technical Solution

In accordance with one aspect of the present invention, provided is a polycarbonate resin composition including (a) a polycarbonate resin; (b) an additive for laser direct structuring; (c) an impact modifier having a core-shell structure; (d) a coloring agent; and two or more selected from the group consisting of (e) an ethylene-containing acrylic impact modifier, (f) a flow modifier, (g) a compound represented by Formula 1 below, and (h) a glass fiber:

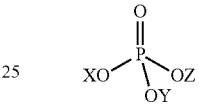

[Formula 1]

wherein X, Y and Z are each independently hydrogen or an alkali metal.

In accordance with another aspect of the present invention, provided is a method of preparing a polycarbonate resin composition, the method including (A) a step of supplying (a) a polycarbonate resin, (b) an additive for laser direct structuring, (c) an impact modifier having a core-shell structure, (d) a coloring agent, and (e) an ethylene-containing acrylic impact modifier to a main feeder of an extruder; (B) a step of supplying (h) a glass fiber to a side feeder of the extruder; and (C) a step of extruding at 200 to 280° C.

Advantageous Effects

As apparent from the fore-going, the present invention advantageously provides a polycarbonate resin composition that realizes a high whiteness degree, exhibits less discoloration due to superior heat stability during storage and processing, and has improved fluidity, laser reactivity, and plating adhesion.

In addition, the present invention provides a method of preparing the polycarbonate resin composition.

The above and other objects can be accomplished by the present invention described below.

BRIEF DESCRIPTION OF DRAWINGS

FIG. 1 shows the compound represented by Formula 1 functioning as a ligand for metal ions.

BEST MODE

Now, the present invention will be described in more detail.

The present inventors continued research to address conventional technical problems and, as a result, confirmed that, when a specific mixture along with an additive for laser direct structuring, an impact modifier having a core-shell structure, and a coloring agent are applied to a polycarbonate resin, high whiteness is realized, discoloration is decreased due to superior heat stability during storage and processing, and superior fluidity, laser reactivity and plating adhesion are exhibited, thus completing the present invention.

The polycarbonate resin composition according to the present invention will be described in detail below.

The polycarbonate resin composition includes (a) polycarbonate resin; (b) an additive for laser direct structuring; (c) an impact modifier having a core-shell structure; (d) a coloring agent; and two or more selected from the group consisting of (e) an ethylene-containing acrylic impact modifier, (f) a flow modifier, (g) a compound represented by Formula 1 below, and (h) a glass fiber:

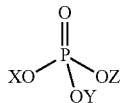

[Formula 1]

wherein X, Y and Z are each independently hydrogen or an alkali metal.

(a) The polycarbonate resin is not specifically limited so long as it is a general polycarbonate resin. For example, (a) the polycarbonate resin may be aromatic polycarbonate, aliphatic polycarbonate, or aromatic-aliphatic polycarbonate.

In a specific example, (a) the polycarbonate resin may be a thermoplastic aromatic polycarbonate polymer or copolymer obtained from a copolymer of an aromatic dihydroxy compound and phosgene or carbonic acid diester.

The aromatic dihydroxy compound may be, for example, one or more selected from the group consisting of 2,2-bis(4-hydroxyphenyl)propane (bisphenol A), tetramethyl bisphenol A, bis(4-hydroxyphenyl)-P-diisopropylbenzene, hydroquinone, resorcinol, and 4,4-dihydroxydiphenyl.

(a) The polycarbonate resin may have a melt index (260° C., 2.16 kg) of, for example, 10 to 80 g/10 min, 10 to 50 g/10 min, or 10 to 30 g/10 min. Within this range, superior impact strength and heat stability are exhibited.

(a) The polycarbonate resin may have a melt index (300° C., 1.2 kg) of, for example, 3 to 35 g/10 min, 5 to 30 g/10 min, or 8 to 27 g/10 min. Within this range, superior impact strength and chemical resistance are exhibited.

(a) The polycarbonate resin may have a number average molecular weight (Mn) of, for example, 3,000 to 100,000 g/mol. Within this range, superior impact strength and heat stability are exhibited.

(a) The polycarbonate resin may be included in an amount of, for example, 30 to 85% by weight, 40 to 85% by weight, or 50 to 85% by weight based on the polycarbonate resin composition. Within this range, superior impact strength and heat stability are exhibited.

(b) The additive for laser direct structuring used in a laser direct structuring (LDS) method is present on a surface of the polycarbonate resin composition. When the additive is exposed to a laser beam, metal particles are activated. Metal particles in an area not exposed to a laser beam are not activated at all. The particles function as a nucleus for crystal growth in a subsequent plating process, e.g., a copper plating process. As other applicable eletroless plating processes, there are, for example, gold plating, nickel plating, silver plating, zinc plating, tin plating, etc. The additive for laser direct structuring is selected such that, after being exposed to a laser beam, an etching area is plated to form a conductive structure.

The plating may be performed on most of an area in which a uniform metal plating layer material is laser-etched, unless specified otherwise. By the plating, a wide window for a laser parameter is exhibited.

(b) The additive for laser direct structuring may be, for example, one or more selected from the group consisting of copper hydroxide phosphate, copper phosphate, copper sulfate and cuprous thiocyanate.

(b) The additive for laser direct structuring may be, for example, an additive for laser direct structuring having a triclinic structure.

The additive for laser direct structuring having the triclinic structure may be, for example, a copper hydroxide phosphate having a triclinic structure.

The copper hydroxide phosphate having the triclinic structure may be, for example, $Cu_3(PO_4)_2.2Cu(OH)_2$, $Cu_3(PO_4)_2.Cu(OH)_2$, or a mixture thereof. In this case, superior property balance and laser reactivity are exhibited.

(b) The additive for laser direct structuring may be included, for example, in an amount of 0.1 to 7% by weight, 1 to 7% by weight, or 2 to 5% by weight based on the polycarbonate resin composition. Within this range, superior laser reactivity and plating adhesion are exhibited.

With regard to (b) the additive for laser direct structuring, since a mica-coated antimony tin oxide ($Sn(Sb)O_2$) publicly known in conventional technology improves heat stability, but causes laser sensitivity defect, mica-coated antimony tin oxide is not used in the present invention.

(c) The impact modifier having a core-shell structure may be, for example, one or more selected from the group consisting of a silicone-acrylic impact modifier, a butadiene based impact modifier, and an acrylic impact modifier. In this case, the impact strength of the polycarbonate resin and plastic resistance against compression and bending increase and thus dimensional stability is improved.

The silicone-acrylic impact modifier may have, for example, a core-shell structure including 10 to 70% by weight of a silicone core and 30 to 90% by weight of a (meth)acrylate based shell, or 20 to 60% by weight of a silicone core and 40 to 80% by weight of a (meth)acrylate based shell.

The silicone-acrylic impact modifier may be, for example, Metablen S-2001 or Metablen S-2006, as series manufactured by MRC.

(c) The impact modifier having a core-shell structure may be included, for example, in an amount of 0.1 to 10% by weight, 1 to 10% by weight, or 3 to 8% by weight based on the polycarbonate resin composition. Within this range, superior impact strength and property balance are exhibited.

With regard to (c) the impact modifier having a core-shell structure, when the butadiene based impact modifier is used with (f) a flow modifier described below, heat stability may be decreased. Accordingly, the butadiene based impact modifier and (f) the flow modifier are not used together in the present invention.

(d) The coloring agent may be, for example, one or more selected from the group consisting of zinc oxide, titanium monoxide, titanium dioxide, titanium trioxide, iron oxide, aluminate, and sodium aluminum sulfosilicate.

(d) The coloring agent may be included, for example, in an amount of 3 to 15% by weight, 5 to 15% by weight, or 8 to 12% by weight based on the polycarbonate resin composition. Within this range, uniform color and superior laser processability are exhibited.

With regard to (d) the coloring agent, since a sulfide, such as zinc sulfide, publicly known in conventional technology may deteriorate impact strength and heat stability, the sulfide is not used in the present invention.

When (e) the ethylene-containing acrylic impact modifier is included with (c) the impact modifier having a core-shell structure, superior compatibility with polycarbonate and superior impact strength are exhibited.

(e) The ethylene-containing acrylic resin may include, for example, 15 to 40% by weight, 20 to 35% by weight, or 25 to 30% by weight of acrylate. Within this range, superior compatibility with polycarbonate and superior impact strength are exhibited.

(e) The ethylene-containing acrylic resin may be, for example, an ethylene-methylacrylate copolymer.

(e) The ethylene-containing acrylic resin may be included, for example, in an amount of 0.1 to 10% by weight, 1 to 8% by weight, or 2 to 5% by weight based on the polycarbonate resin composition. Within this range, superior toughness and fluidity are exhibited.

(f) The flow modifier may be, for example, one selected from phenylene diphosphates. In a specific example, the flow modifier may be tetrakis(2,6-dimethylphenyl)m-phenylene diphosphate.

(f) The flow modifier may be included, for example, in an amount of 0.1 to 10% by weight, 0.5 to 8% by weight, or 1 to 5% by weight based on the polycarbonate resin composition. Within this range, temperature increase by shear during extrusion and injection processes is decreased.

When (f) the flow modifier is used with a butadiene based impact modifier as (c) the impact modifier having a core-shell structure, heat stability may be decreased. Accordingly, (f) the flow modifier and the butadiene based impact modifier are not used together in the present invention.

Of X, Y and Z of (g) the compound represented by Formula 1, one may be, for example, an alkali metal and two may be, for example, hydrogen. The alkali metal may be, for example, sodium or potassium. In a specific example, (g) the compound represented by Formula 1 may be monosodium phosphate.

(g) The compound represented by Formula 1, for example, may function as a reaction suppressor.

"Reaction" suppressed by the reaction suppressor, for example, may mean a reaction of decomposing (a) the polycarbonate resin as metal ions, such as copper ions, which may be included in (b) the additive for laser direct structuring, are activated.

(g) The compound represented by Formula 1, for example, functions as a ligand for metal ions, such as copper ions, which may be included in (b) the additive for laser direct structuring, thus forming stable complex ions with the metal ions such as copper ions (see FIG. 1). Accordingly, (g) the compound represented by Formula 1 may function as a reaction suppressor to suppress decomposition of (a) the polycarbonate resin.

(g) The compound represented by Formula 1 may be included, for example, in an amount of 0.1 to 1% by weight, 0.1 to 0.8% by weight, or 0.1 to 0.4% by weight based on the polycarbonate resin composition. Within this range, heat stability is improved and temperature increase by shear during extrusion and injection processes may be decreased.

(h) The glass fiber, for example, may have a length of 2 to 5 mm, a width of 15 to 40 µm, a thickness of 5 to 20 µm, or a length of 2 to 4 mm, a width of 15 to 40 µm, and a thickness of 5 to 15 µm. Within this range, efficient rigidity may be secured and an appearance defect rate during product molding may be decreased.

In particular, when the length of (h) the glass fiber is shorter than the range, superior appearance is exhibited and deformation is decreased, but rigidity and impact characteristics are remarkably decreased. When the length of (h) the glass fiber is longer than the range, rigidity and impact characteristics are improved, but glass fibers protrude from an appearance and deformation increases.

An aspect ratio (δ), which is calculated by Equation 1 below, of (h) the glass fiber may be, for example, 100 to 300, 100 to 250, or 100 to 200. Within this range, very strong binding force between polymers is maintained and thus rigidity increases. Accordingly, upon processing of plastic components in which rigidity is prioritized, the resin according to the present invention may substitute for expensive resins and metals.

$$\text{Aspect ratio}(\delta)=L/D \qquad \text{[Equation 1]}$$

wherein L is a length of a glass fiber and D is a width of a glass fiber, wherein, when a cross section perpendicularly cut in a length direction is a rectangle, the length corresponds to a length of a longest side of the rectangle and, when the cross section is an ellipse, the length corresponds to a longest diameter of the cross section.

(h) The glass fiber may be, for example, chopped glass fiber surface-treated with silane or olefin. In this case, very strong binding force between a polymer is maintained, thereby the rigidity of the polycarbonate resin composition is complemented and bending characteristics and surface smoothness are enhanced.

(h) The glass fiber may, for example, be a cylindrical type, a cocoon type, or a flat type. In this case, very strong binding force between polymers is maintained, whereby the rigidity of the polycarbonate resin composition is improved and bending characteristics and surface smoothness are improved.

(h) The glass fiber may be included, for example, in an amount of 10 to 50% by weight, 20 to 40% by weight, or 25 to 35% by weight based on the polycarbonate resin composition. Within this range, superior rigidity, fluidity, and appearance are exhibited.

With regard to (h) the glass fiber, when the polycarbonate resin composition includes (h) a glass fiber described below but does not include the additive for laser direct structuring having a triclinic structure, laser sensitivity and plating adhesion may be decreased. Accordingly, (h) the glass fiber is preferably included with the additive for laser direct structuring having a triclinic structure.

The polycarbonate resin composition may have, for example, a color L value (thickness of 1.2 mm (±10%)) of 85 to 99, 88 to 97, or 90 to 95.

The polycarbonate resin composition may have, for example, an impact strength (notched Izod impact strength, ¼ inch) of 50 to 70 kgf·cm/cm, 55 to 67 kgf·cm/cm, or 59 to 65 kgf·cm/cm.

In another example, the polycarbonate resin composition may have an impact strength (notched Izod impact strength, ¼ inch) of 5 kgf·cm/cm or more, 5 to 20 kgf·cm/cm, or 5 to 15 kgf·cm/cm.

The polycarbonate resin composition may have, for example, a melt index (220° C., 10 kg) of 6 to 25 g/10 min, 7 to g/10 min, or 8 to 20 g/10 min. Within this range, superior processability is exhibited.

The polycarbonate resin composition may include a variety of generally added additives. Alternatively, a mixture of the additives may be used. The additives may be properly mixed during mixing of ingredients for forming the composition. When one or more additives are included in the polycarbonate resin composition, the characteristics of the one or more additives may be provided to the polycarbonate resin composition and a molded article produced from the composition. The additive may be, for example, one or more selected from the group consisting of a processing stabilizer, a plasticizer, an antistatic agent, a release agent, a UV absorber, a lubricant, a pigment, a dye, and a flow promoter. In addition, as needed, an antioxidant, such as IR 1076, and a stabilizer, such as IF 168, may be used. In particular, the IR 1076, as a primary heat stabilizer, does not affect the color of a resin. The resin color may be affected by a secondary heat stabilizer, but the IF 168 does not affect the resin color.

The polycarbonate resin composition of the present invention may be prepared according to a general preparation method. For example, each constituent may be first mixed in a high-speed mixer, or may be mixed by a low shear method, as another method. Subsequently, the mixed mixture may be supplied to a neck of a twin-screw extruder via a hopper. One or more ingredients may be supplied to the neck via a side hopper and/or directly supplied into the extruder from down stream to be mixed with the composition. The extruder may be operated at a higher temperature than a temperature generally required for flowing of a composition. A prepared extrudate may be rapidly cooled in a bath and prepared into pellets.

When the extrudate is cut, the lengths of pellets may be ¼ inches or less, as needed. The prepared pellets may be used in a subsequent casting, molding, or preparation step.

A method of preparing the polycarbonate resin composition may include, for example, (A) a step of supplying (a) a polycarbonate resin, (b) an additive for laser direct structuring, (c) an impact modifier having a core-shell structure, (d) a coloring agent, and (e) an ethylene-containing acrylic impact modifier to a main feeder of an extruder; (B) a step of supplying (h) a glass fiber to a side feeder of the extruder; and (C) a step of extruding at 200 to 280° C.

In step (A) in which each constituent is supplied to the main feeder of the extruder, for example, a compound represented by Formula 1 below may be supplied therewith:

[Formula 1]

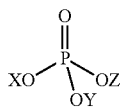

wherein X, Y and Z are each independently hydrogen or an alkali metal.

The method of preparing the polycarbonate resin composition may include, for example, a step of plating an extrudate obtained after step (C), as an extrusion step.

A molded article according the present invention may include, for example, the polycarbonate resin composition. The polycarbonate resin composition may be molded into a useful molded article by, for example, injection molding, extrusion molding, rotation molding, blow molding, thermal molding, etc. The molded article may be, for example, a communication device such as a mobile phone antenna, an antenna for portable electronic equipment, an antenna for RFID, or an antenna for M/P (internal antenna), an electrical unit for automobiles, a white home appliance, an NFC antenna, an alternative to a cable, or a complex component of a semiconductor IC.

Now, preferred embodiments are provided to aid in understanding of the present invention. The embodiments are shown by way of example and those skilled in the art will appreciate that various modifications and changes can be made to the present invention without departing from the spirit and essential characteristics of the present invention. In addition, it is to be appreciated that such modifications and changes are included in the scope of the accompanying claims.

EXAMPLES

Examples 1 to 10, Comparative Examples 1 and 2

The following constituents were mixed in amounts summarized in Table 1 below. Resultant mixtures were melted and kneaded by means of a 250 to 260° C. twin-screw extruder and prepared into pellets. Subsequently, the pellets were prepared into polycarbonate resin composition specimens by means of a 250 to 270° C. injection machine.

TABLE 1

| Classification | Examples | | | | | | | | | | Comparative Examples | |
|---|---|---|---|---|---|---|---|---|---|---|---|---|
| | 1 | 2 | 3 | 4 | 5 | 6 | 7 | 8 | 9 | 10 | 1 | 2 |
| A-1 | 82.3 | — | — | — | — | — | — | — | — | — | — | — |
| A-2 | — | 82.3 | 83.3 | 82.3 | 75.3 | 84.4 | 78.3 | 79.8 | 82.3 | — | 82.5 | 84.5 |
| A-3 | — | — | — | — | — | — | — | — | — | 82.3 | — | — |
| B-1 | 3.5 | 3.5 | 3.5 | 3.5 | 3.5 | 3.5 | 3.5 | 2.0 | 5.0 | 3.5 | 3.5 | 3.5 |
| C-1 | 4 | 4 | 4 | — | 8 | 2 | 4 | 4 | 4 | 4 | 4 | 4 |
| C-2 | — | — | — | 4 | — | — | — | — | — | — | — | — |
| D-1 | 8 | 8 | 8 | 8 | 8 | 8 | 12 | 12 | 8 | 8 | 8 | 8 |
| F | 2 | 2 | 1 | 2 | 5 | 2 | 2 | 2 | 2 | 2 | 2 | — |
| G | 0.2 | 0.2 | 0.2 | 0.2 | 0.2 | 0.1 | 0.2 | 0.2 | 0.4 | 0.2 | — | — |

* (A-1, PC): Polycarbonate resin having a melt index (260° C., 2.16 kg) of 10 g/10 min was used.
* (A-2, PC): Polycarbonate resin having a melt index (260° C., 2.16 kg) of 25 g/10 min was used.
* (A-3, PC): Polycarbonate resin having a melt index (260° C., 2.16 kg) of 40 g/10 min was used.
* (B-1, LDS additive): Iriotec 8840, 80% of particles of which had a size of less than 10 μm, as copper hydroxide phosphate, manufactured by Merck was used.
* (C-1, impact modifier): Metablen S-2001 (silicone-acrylate rubber) manufactured by MRC, Japan was used.
* (C-2, impact modifier): Metablen S-2006 (silicone-acrylate rubber) manufactured by MRC, Japan was used.
* (D-1, coloring agent): Kronos 2233 (TiO$_2$) manufactured by Kronos was used.
* (F, flow modifier): PX-200 manufactured by Dai-Hachi, Japan was used.
* (G, reaction suppressor): Monosodium phosphate was used.

Examples 11 to 15 and Comparative Examples 3 to 7

Constituents, except for the following ingredient (F), were mixed in amounts summarized in Table 2 below. Resultant mixtures were fed into a main feeder of a twin-screw extruder. The ingredient (F) was fed into a side feeder of the twin-screw extruder and then melted and kneaded at 270° C. to prepare pellets. Subsequently, the pellets were prepared into polycarbonate resin composition specimens by means of an injection machine.

TABLE 2

| Classifi- | Examples | | | | | Comparative Examples | | | | |
|---|---|---|---|---|---|---|---|---|---|---|
| cation | 11 | 12 | 13 | 14 | 15 | 3 | 4 | 5 | 6 | 7 |
| A-4 | 52.8 | — | — | — | — | 52.8 | — | — | — | — |
| A-5 | — | 52.8 | 52.8 | 53 | 52.8 | — | 52.8 | 52.8 | 53 | 52.8 |
| B-1 | — | — | — | — | — | 3 | 3 | 3 | 3 | — |
| B-2 | 3 | 3 | 3 | 3 | 3 | — | — | — | — | — |
| B-3 | — | — | — | — | — | — | — | — | — | 3 |
| C-1 | 3 | 3 | — | 3 | 3 | 3 | 3 | — | 3 | 3 |
| C-3 | — | — | 3 | — | — | — | — | 3 | — | — |
| D-1 | 8 | 8 | 8 | 8 | — | 8 | — | 8 | 8 | 8 |
| D-2 | — | — | — | — | 8 | — | 8 | — | — | — |
| E | 3 | 3 | 3 | 3 | 3 | 3 | 3 | 3 | 3 | 3 |
| G | 0.2 | 0.2 | 0.2 | — | 0.2 | 0.2 | 0.2 | 0.2 | — | 0.2 |
| H | 30 | 30 | 30 | 30 | 30 | 30 | 30 | 30 | 30 | 30 |

* (A-4, PC): Polycarbonate resin having a melt index (300° C., 1.2 kg) of 10 g/10 min was used.
* (A-5, PC): Polycarbonate resin having a melt index (300° C., 1.2 kg) of 22 g/10 min was used.
* (B-1, LDS an additive): Iriotec 8840, 80% of particles of which had a size of less than 10 μm, as copper hydroxide phosphate, manufactured by Merck, was used.
* (B-2, LDS additive): $Cu_3(PO_4)_2$ having a triclinic structure was used.
* (B-3, LDS additive): Iriotec 8825, wherein a mica content was 46 to 62% by weight, a $(Sn/Sb)O_2$ content was 38 to 54% by weight, and 98% of particles had a size of less than 15 μm, manufactured by Merck was used.
* (C-1, impact modifier): Metablen S-2001 (silicone-acrylate rubber) manufactured by MRC, Japan was used.
* (C-3, impact modifier): EM500 (MBS) manufactured by LG chemistry was used.
* (D-1, coloring agent): Kronos 2233 ($TiO_2$) manufactured by Kronos was used.
* (D-2, a coloring agent): R104 manufactured by DuPont was used.
* (E, ethylene-containing acrylic impact modifier): Elvaloy 1330AC (ethylene methyl-acrylate copolymer) manufactured by DuPont was used.
* (G, reaction suppressor): Monosodium phosphate was used.
* (H, glass fiber): A glass fiber having an aspect ratio (δ), calculated by Equation 1 below, of 150 and surface-treated with an epoxy silane based compound having a width (D) of 20 μm, a thickness of 10 μm, a length (L) of 3 mm, manufactured by Nittobo was used.

$$\text{Aspect ratio}(\delta) = L/D \quad \text{[Equation 1]}$$

TEST EXAMPLES

Properties of the polycarbonate resin composition specimens obtained according to Examples 1 to 10 and Comparative Examples 1 and 2 were measured according to the following methods. Results are summarized in Table 3 below.

In addition, properties of the polycarbonate resin composition specimens obtained according to Examples 11 to 15 and Comparative Examples 3 to 7 were measured according to the following methods. Results are summarized in Table 4 below.

Measurement Methods

Color (discoloration degree, L, a, b): Colors of specimens having a thickness of 1.2 mm (±10%) were measured according to ASTM D1500 as a standard measurement method.

Impact strength (notched Izod impact strength, kgf·cm/cm): Measured using ¼" specimens according to ASTM D256 as a standard measurement method.

Melt index (Melt Index, g/10 min): The melt index of each polycarbonate resin was measured at 260° C. under a load of 2.16 kg and at 300° C. under a load of 1.2 kg according to ASTM D1238 as a standard measurement method. The melt index of each polycarbonate resin composition was measured at 220° C. under a load of 10 kg.

Residence stability (ΔE after residence): L, a, and b values, as color values, of a specimen, which was directly injected at 210° C. and injected after being resided at 250° C. for 15 minutes, were measured by means of a Hunter Lab colorimeter and ΔE was calculated according to Equation 2 below. Residence stability is superior as ΔE is close to 0.

$$\Delta E = \sqrt{\{(L-L')^2 + (a-a')^2 + (b-b')^2\}} \quad \text{[Equation 2]}$$

Laser sensitivity: Laser sensitivity was measured at a wavelength of 1,064 nm by means of an SPI Fiber pulsed laser device manufactured by SPI laser. Laser sensitivity was graded as follows. 1: very satisfactory, 2: satisfactory, 3: normal, 4: poor, and 5: very poor.

Plating adhesion: A specimen was subjected to Cu/Ni electroless plating, and plating adhesion was measured using a tape, which had an adhesion of 4.9 N/100 mm to steel, according to ASTM D3359 class 4B to 5B as a standard measurement method. Grading was performed depending upon the amount of the plated surface attached to the tape by the test. Grading was made as follows. 1: plated surface not detached, 2: satisfactory, 3: normal, 4: poor, 5: very poor.

Whiteness degree: Measured using the specimen by means of a Suga color computer.

TABLE 3

| Classifi- | Examples | | | | | | | | | | Comparative Examples | |
|---|---|---|---|---|---|---|---|---|---|---|---|---|
| cation | 1 | 2 | 3 | 4 | 5 | 6 | 7 | 8 | 9 | 10 | 1 | 2 |
| L* | 93 | 93 | 91 | 94 | 90 | 94 | 94 | 95 | 92 | 93 | 89 | 86 |
| a* | −2.5 | −2.6 | −2.9 | −1.9 | −1.6 | −3.0 | −1.8 | −1.5 | −3.2 | −2.7 | −1.1 | −0.5 |
| b* | 2.5 | 2.3 | 2.7 | 2.9 | 2.8 | 1.9 | 2.8 | 2.1 | 2.0 | 2.3 | 3.2 | 4.3 |
| IS | 65 | 64 | 66 | 64 | 59 | 60 | 62 | 64 | 61 | 63 | 62 | 68 |

As shown in Table 3, can be confirmed that, in Examples 1 to 10 according to the present invention, color (discoloration degree) and impact strength are improved.

On the other hand, it can be confirmed that, in Comparative Example 1 in which the reaction suppressor is not added, color (discoloration degree) is slightly decreased and, in Comparative Example 2 in which all of a flow modifier and a reaction suppressor are not added, color (discoloration degree) is rapidly deteriorated.

That is, it can be confirmed that, from the results, color (discoloration degree) is improved when the polycarbonate resin composition including the polycarbonate resin, the additive for laser direct structuring, the impact modifier having a core-shell structure, and the coloring agent further includes a flow modifier and a reaction suppressor.

TABLE 4

| Classifi-cation | Examples | | | | | Comparative Examples | | | | |
|---|---|---|---|---|---|---|---|---|---|---|
| | 11 | 12 | 13 | 14 | 15 | 3 | 4 | 5 | 6 | 7 |
| MI | 8 | 18 | 16 | 18 | 19 | 100 | X | X | X | 16 |
| ΔE | 3 | 2 | 2 | 3 | 3 | 20 | 27 | 23 | 25 | 2 |
| IS | 7 | 8 | 8 | 7 | 8 | 3 | 2 | 2 | 3 | 8 |
| Laser sensitivity | 1 | 1 | 1 | 1 | 2 | 5 | 5 | 5 | 5 | 3 |
| Plating adhesion | 1 | 1 | 1 | 1 | 2 | 5 | 5 | 5 | 5 | 3 |

As shown in Table 4, can be confirmed that, in Examples 11 to 15 according to the present invention, ΔE after residence is remarkably decreased and all of a melt index, impact strength, laser sensitivity and plating adhesion are superior.

On the other hand, it can be confirmed that, as comparative examples in which the polycarbonate resin composition including the glass fiber is used, laser sensitivity and plating adhesion are very poor in Comparative Examples 3 to 6 in which the additive for laser direct structuring having a triclinic structure is not used, and polycarbonate is decomposed and, accordingly, a melt index (220° C., 10 kg) cannot be measured in Comparative Examples 4 to 6. In addition, it can be confirmed that, in Comparative Example 7 in which the additive for laser direct structuring not having a triclinic structure is used, laser sensitivity and plating adhesion are decreased.

REFERENCE EXAMPLES

Reference Examples 1 to 4

The following ingredients were mixed according to contents summarized in Table 5 below and melted and kneaded by means of a 250 to 260° C. twin-screw extruder, thereby being prepared into pellets. The pellets were prepared into polycarbonate resin composition specimens by means of a 250 to 270° C. injection machine.

TABLE 5

| Classification | Reference Examples | | | |
|---|---|---|---|---|
| | 1 | 2 | 3 | 4 |
| A-2 | 86.3 | 82.5 | 82.5 | 82.5 |
| B-1 | 3.5 | 3.5 | 3.5 | 3.5 |
| C-1 | — | — | — | 4 |
| C-3 | — | — | 4 | — |
| C-4 | — | 4 | — | — |
| D-1 | 8 | 8 | 8 | — |
| D-3 | — | — | — | 8 |

TABLE 5-continued

| Classification | Reference Examples | | | |
|---|---|---|---|---|
| | 1 | 2 | 3 | 4 |
| F | 2 | 2 | 2 | 2 |
| G | 0.2 | — | — | — |

* (A-2, PC): Polycarbonate resin having a melt index (260° C., 2.16 kg) of 25 g/10 min was used.
* (B-1, LDS additive): Iriotec 8840, as copper hydroxide phosphate, 80% of particles of which has a size of less than 10 μm and which was manufactured by Merck, was used.
* (C-1, impact modifier): Metablen S-2001 (silicone-acrylate rubber) manufactured by MRC, Japan was used.
* (C-3, impact modifier): EM500 (MBS) manufactured by LG chemistry was used.
* (C-4, impact modifier): DP270E (ABS) manufactured by LG chemistry was used.
* (D-1, coloring agent): Kronos 2233 (TiO$_2$) manufactured by Kronos was used.
* (D-3, coloring agent): ZnS manufactured by Sachtolith was used.
* (F, flow modifier): PX-200 manufactured by Dai-Hachi, Japan was used.
* (G, reaction suppressor): Monosodium phosphate was used.

Properties of polycarbonate resin composition specimens obtained according to Reference Examples 1 to 4 were measured according to the methods. Results are summarized in Table 6 below.

TABLE 6

| Classification | Reference Examples | | | |
|---|---|---|---|---|
| | 1 | 2 | 3 | 4 |
| L* | 95 | 85 | 87 | 79 |
| a* | −3.0 | −0.1 | −0.3 | 2.3 |
| b* | 2.0 | 7.2 | 4.3 | 7.8 |
| IS | 29 | 23 | 28 | 8 |

As shown in Table 6, can be confirmed that, in Reference Example 1 in which the impact modifier having a core-shell structure is not added, impact strength is remarkably decreased.

In addition, it can be confirmed that, in Reference Examples 2 and 3, in which the butadiene based impact modifier is added along with the flow modifier, and Reference Example 4, in which zinc sulfide, as a coloring agent, is added, color (discoloration degree) and impact strength are remarkably deteriorated.

The invention claimed is:
1. A polycarbonate resin composition, comprising:
(a) a polycarbonate resin;
(b) an additive for laser direct structuring;
(c) an impact modifier having a core-shell structure;
(d) a coloring agent; and
two or more selected from the group consisting of (e) an ethylene-containing acrylic impact modifier, (f) a flow modifier, (g) a compound represented by Formula 1 below, and (h) a glass fiber:

[Formula 1]

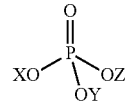

wherein X, Y and Z are each independently hydrogen or an alkali metal, and
wherein (b) the additive for laser direct structuring is a triclinic copper phosphate.

2. The polycarbonate resin composition according to claim 1, wherein (a) the polycarbonate resin has a melt index (300° C., 1.2 kg) of 3 to 35 g/10 min.

3. The polycarbonate resin composition according to claim 1, wherein (a) the polycarbonate resin is comprised in an amount of 30 to 85% by weight based on the polycarbonate resin composition.

4. The polycarbonate resin composition according to claim 1, wherein, when the polycarbonate resin composition comprises (h) the glass fiber.

5. The polycarbonate resin composition according to claim 1, wherein (b) the additive for laser direct structuring is comprised in an amount of 0.1 to 7% by weight based on the polycarbonate resin composition.

6. The polycarbonate resin composition according to claim 1, wherein (c) the impact modifier having a core-shell structure is one or more selected from the group consisting of a silicone-acrylic impact modifier, a butadiene based impact modifier, and an acrylic impact modifier.

7. The polycarbonate resin composition according to claim 1, wherein (c) the impact modifier having a core-shell structure is comprised in an amount of 0.1 to 10% by weight based on the polycarbonate resin composition.

8. The polycarbonate resin composition according to claim 1, wherein (d) the coloring agent is one or more selected from the group consisting of zinc oxide, titanium monoxide, titanium dioxide, titanium trioxide, iron oxide, aluminate, and sodium aluminum sulfosilicate.

9. The polycarbonate resin composition according to claim 1, wherein (d) the coloring agent is comprised in an amount of 3 to 15% by weight based on the polycarbonate resin composition.

10. The polycarbonate resin composition according to claim 1, wherein (e) the ethylene-containing acrylic impact modifier comprises 15 to 40% by weight of acrylate.

11. The polycarbonate resin composition according to claim 1, wherein (e) the ethylene-containing acrylic impact modifier is comprised in an amount of 0.1 to 10% by weight based on the polycarbonate resin composition.

12. The polycarbonate resin composition according to claim 1, wherein (f) the flow modifier is tetrakis(2,6-dimethylphenyl)m-phenylene diphosphate.

13. The polycarbonate resin composition according to claim 1, wherein (f) the flow modifier is comprised in an amount of 0.1 to 10% by weight based on the polycarbonate resin composition.

14. The polycarbonate resin composition according to claim 1, wherein, of X, Y and Z of (g) the compound represented by Formula 1, one is an alkali metal and two are hydrogen.

15. The polycarbonate resin composition according to claim 1, wherein (g) the compound represented by Formula 1 is comprised in an amount of 0.1 to 1% by weight based on the polycarbonate resin composition.

16. The polycarbonate resin composition according to claim 1, wherein (h) the glass fiber has a length of 2 to 5 mm, a width of 15 to 40 μm, and a thickness of 5 to 20 μm.

17. The polycarbonate resin composition according to claim 1, wherein (h) the glass fiber is comprised in an amount of 10 to 50% by weight based on the polycarbonate resin composition.

18. A method of preparing a polycarbonate resin composition, the method comprising:
(A) a step of supplying (a) a polycarbonate resin, (b) an additive for laser direct structuring, (c) an impact modifier having a core-shell structure, (d) a coloring agent, and (e) an ethylene-containing acrylic impact modifier to a main feeder of an extruder;
(B) a step of supplying (h) a glass fiber to a side feeder of the extruder; and
(C) a step of extruding at 200 to 280° C.,
wherein (b) the additive for laser direct structuring is a triclinic copper phosphate.

19. The method according to claim 18, wherein (g) a compound represented by Formula 1 below is further supplied to the main feeder of the extruder of step (A):

[Formula 1]

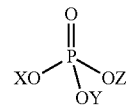

wherein X, Y and Z are each independently hydrogen or an alkali metal.

* * * * *